Sept. 24, 1940.  A. M. FLEMING ET AL  2,215,693
WELDING APPARATUS
Filed July 16, 1938  9 Sheets-Sheet 3
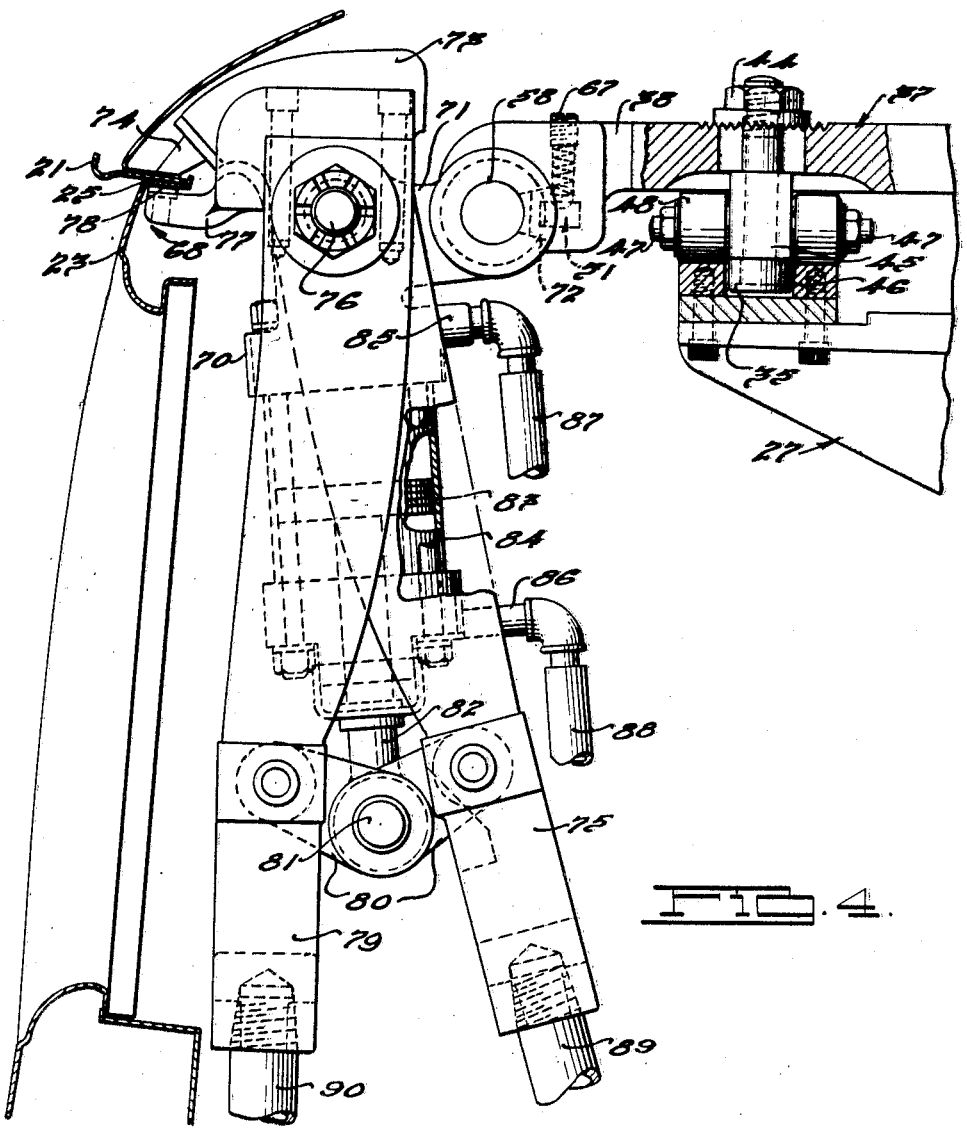
INVENTOR
ALEXANDER M. FLEMING AND
BY ANTONIO B. CANALES
ATTORNEYS.

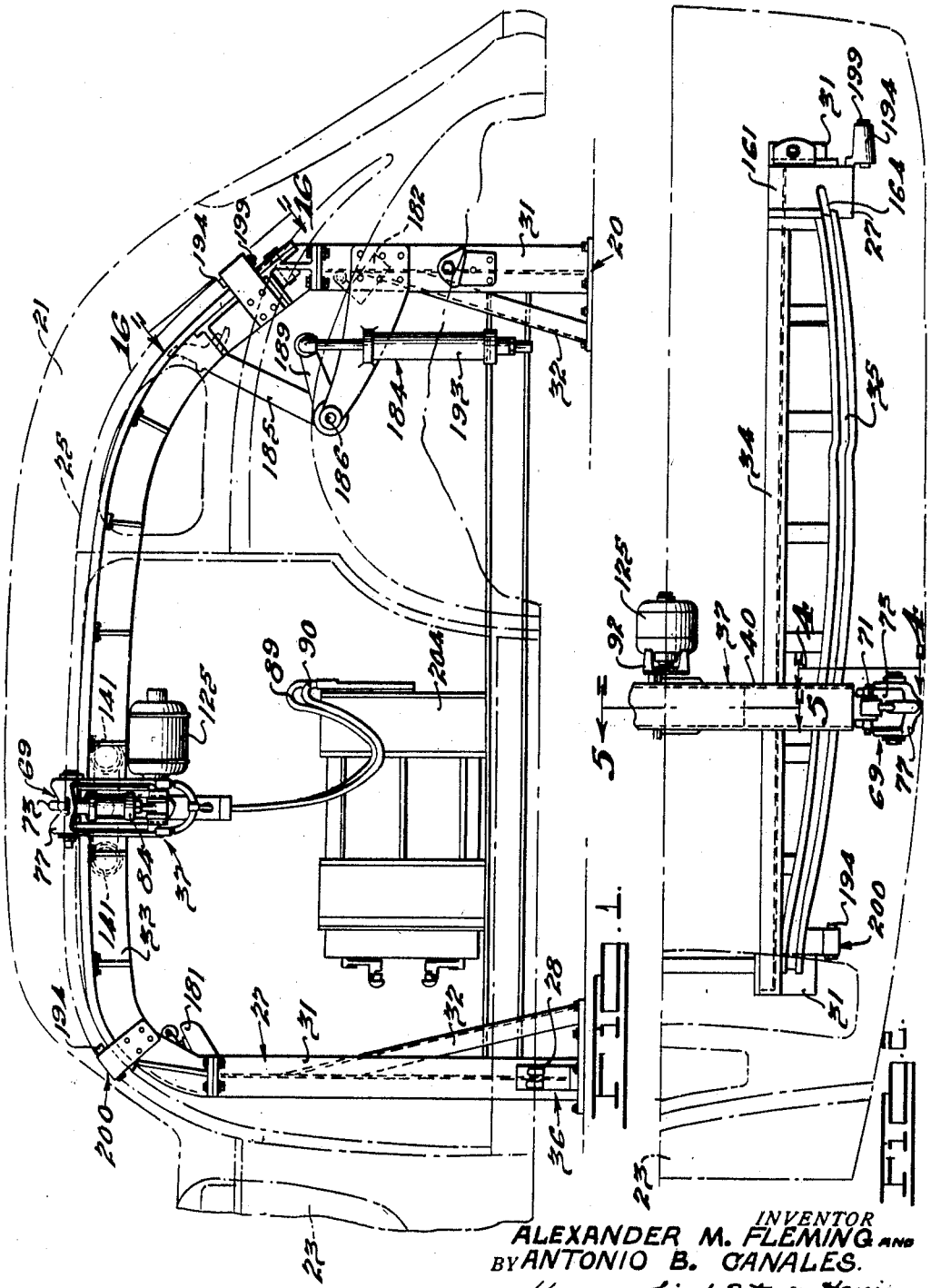

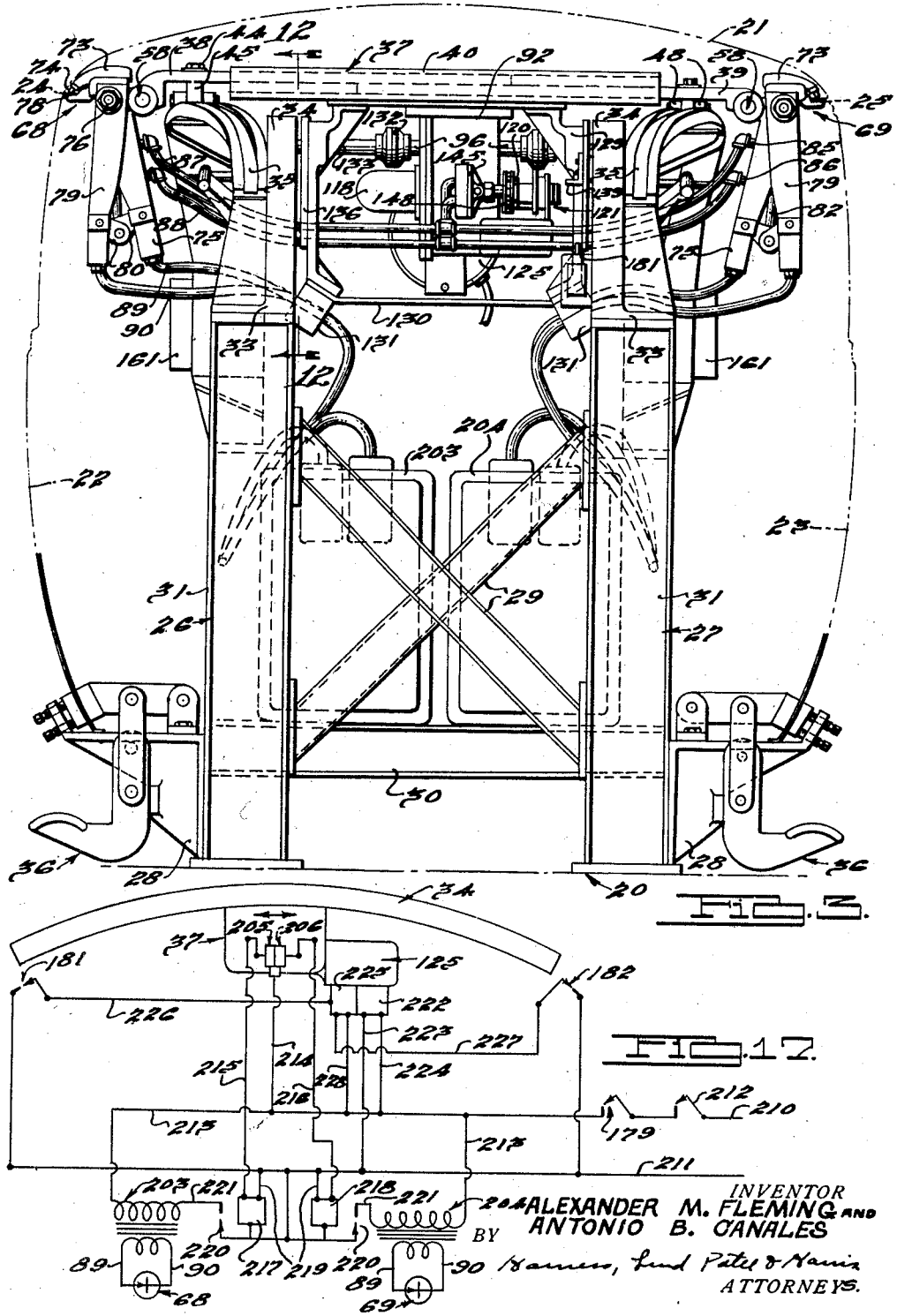

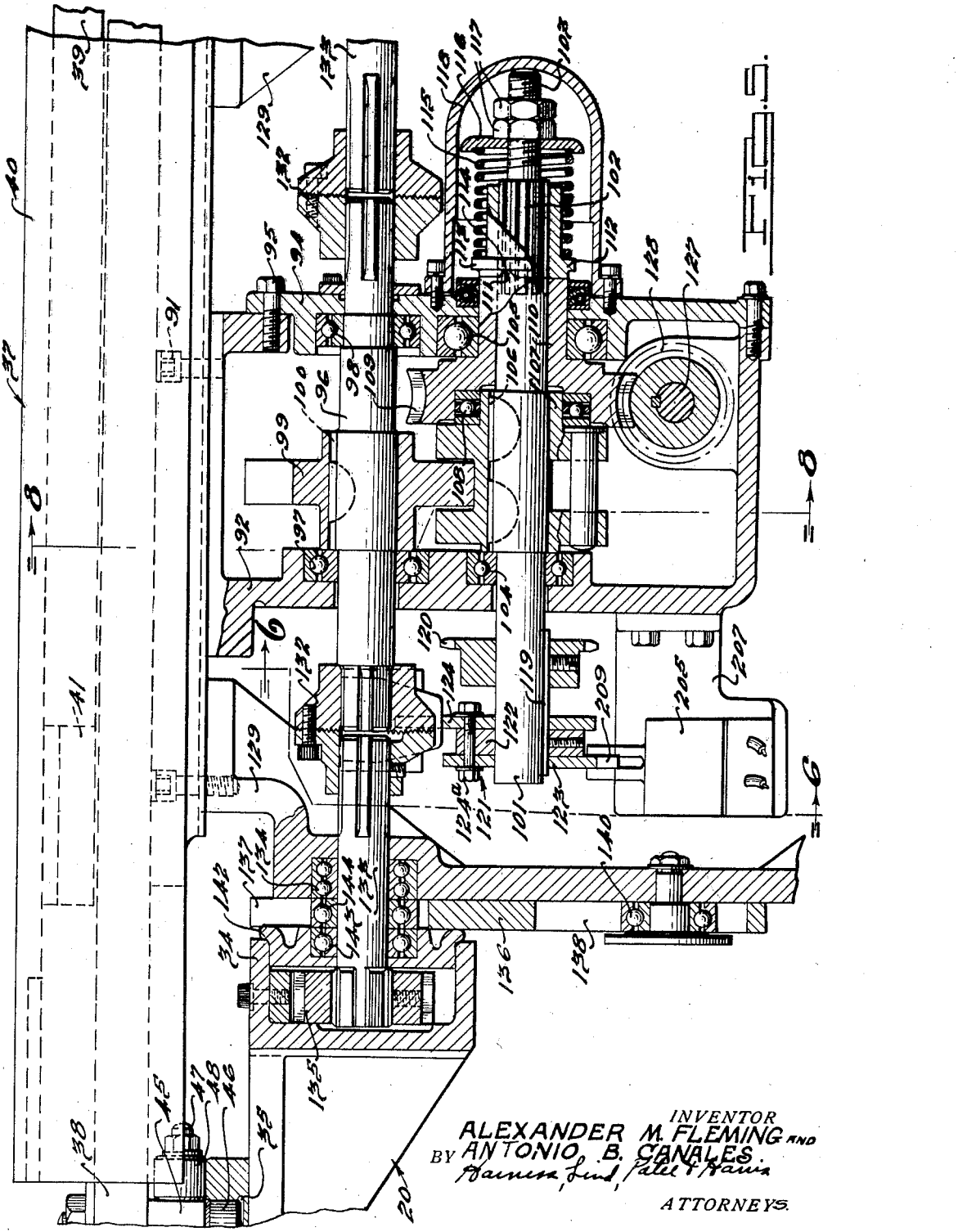

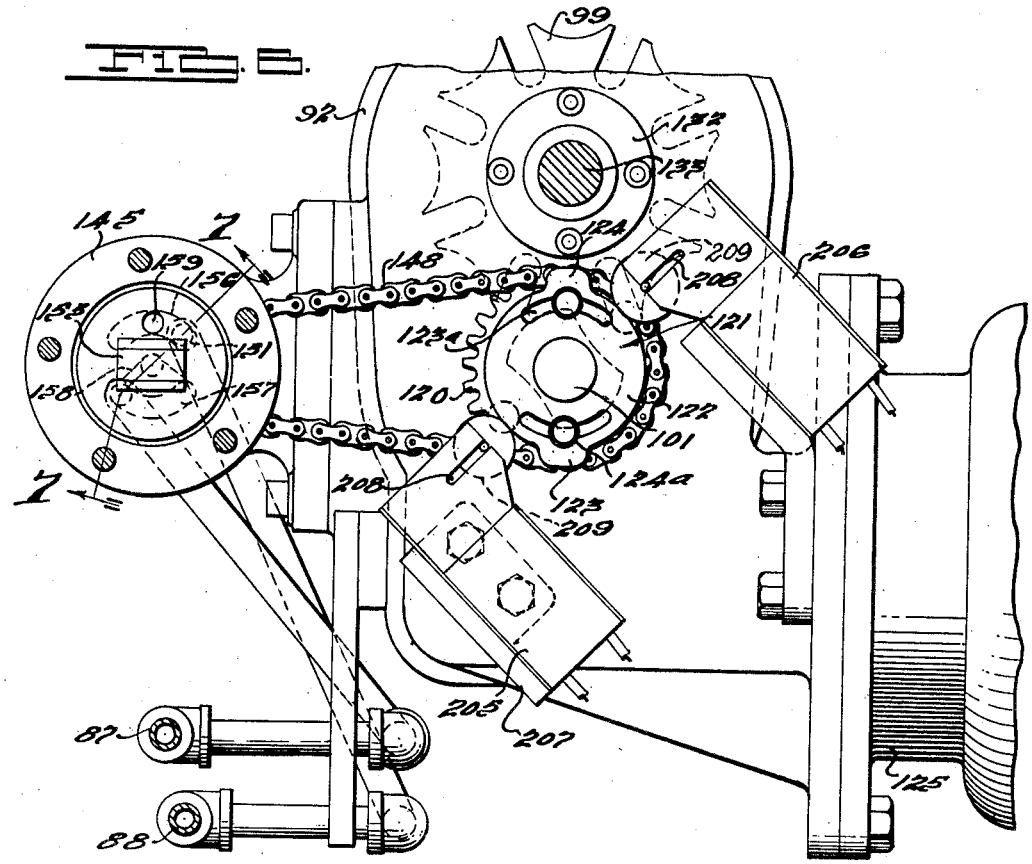

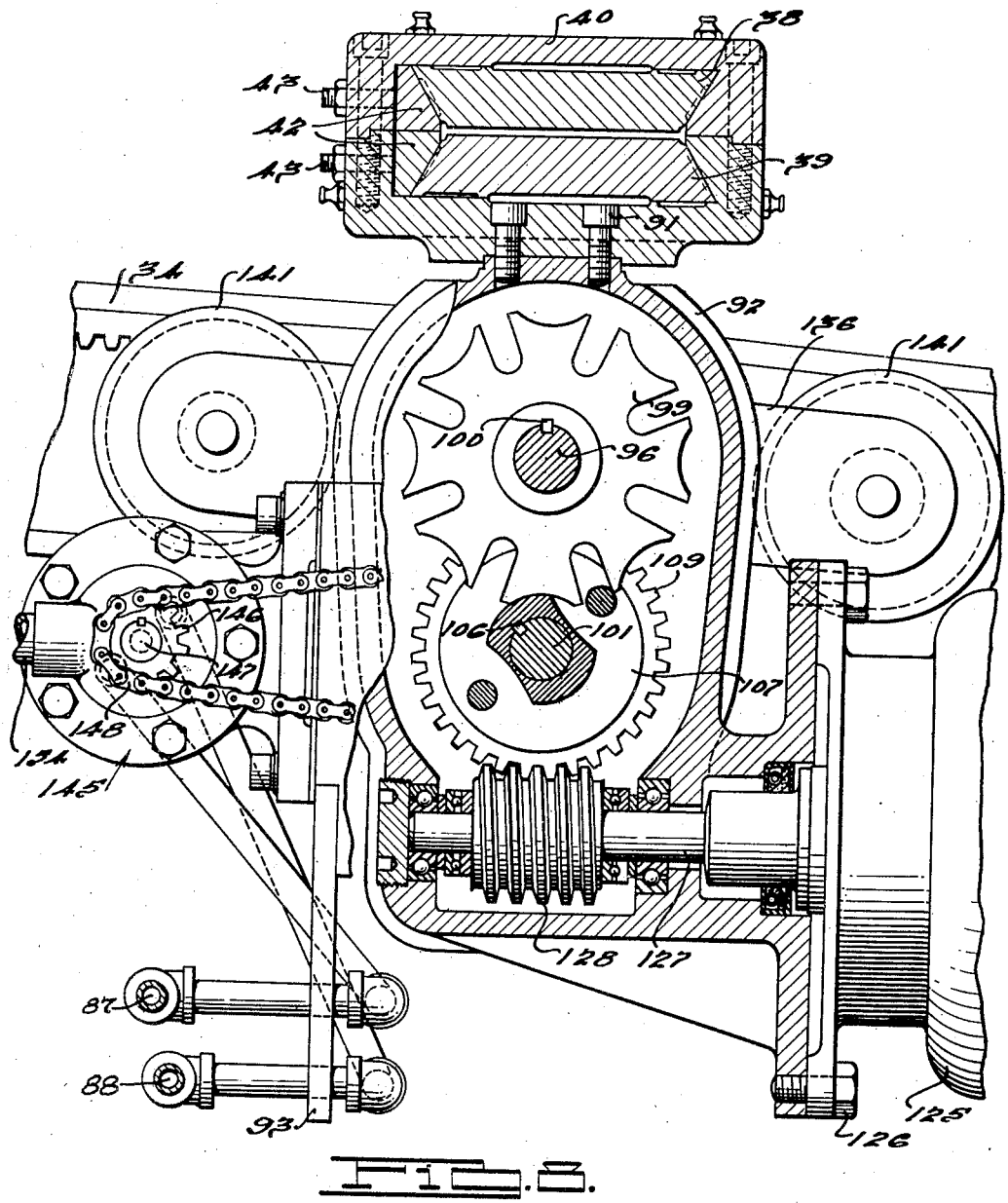

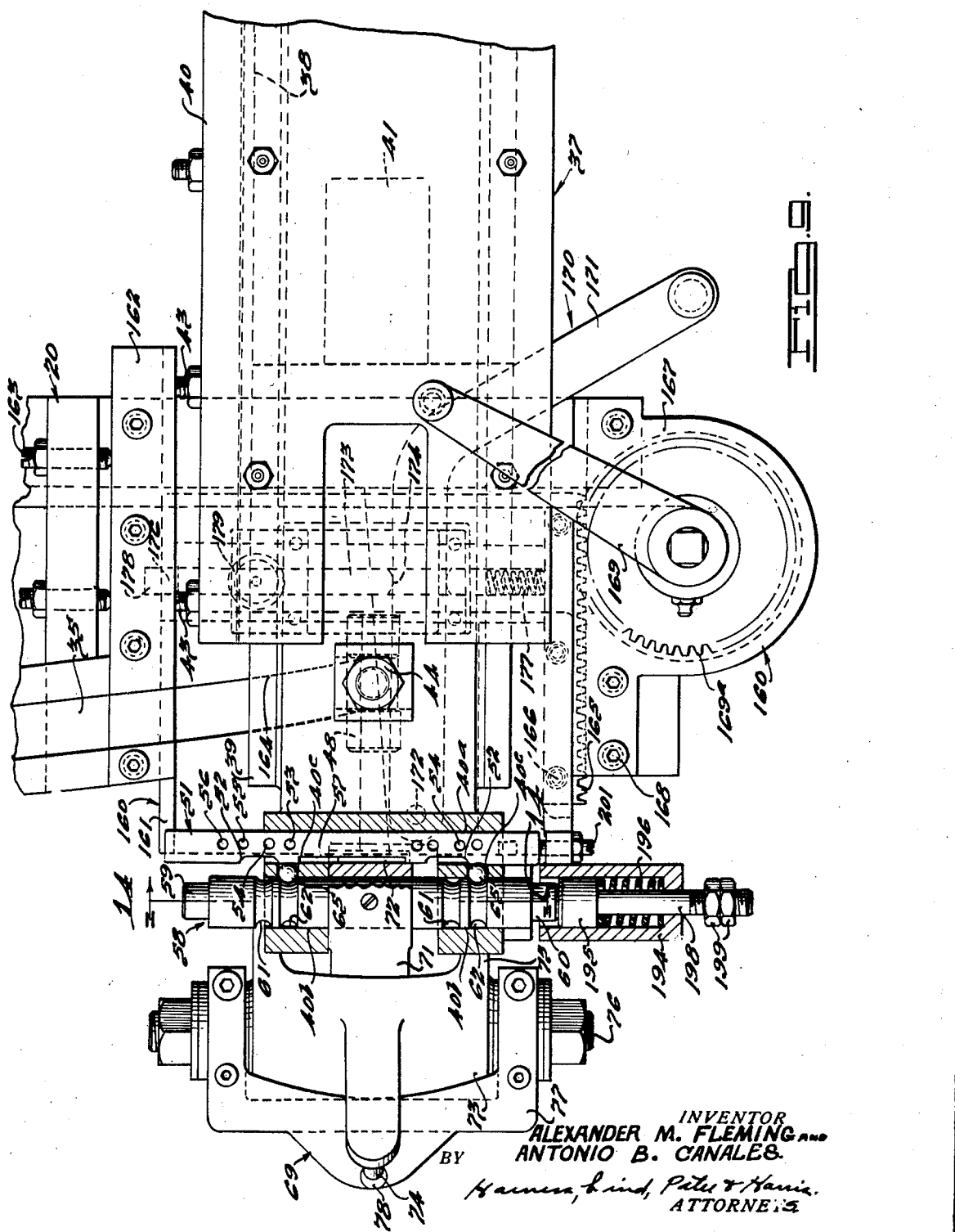

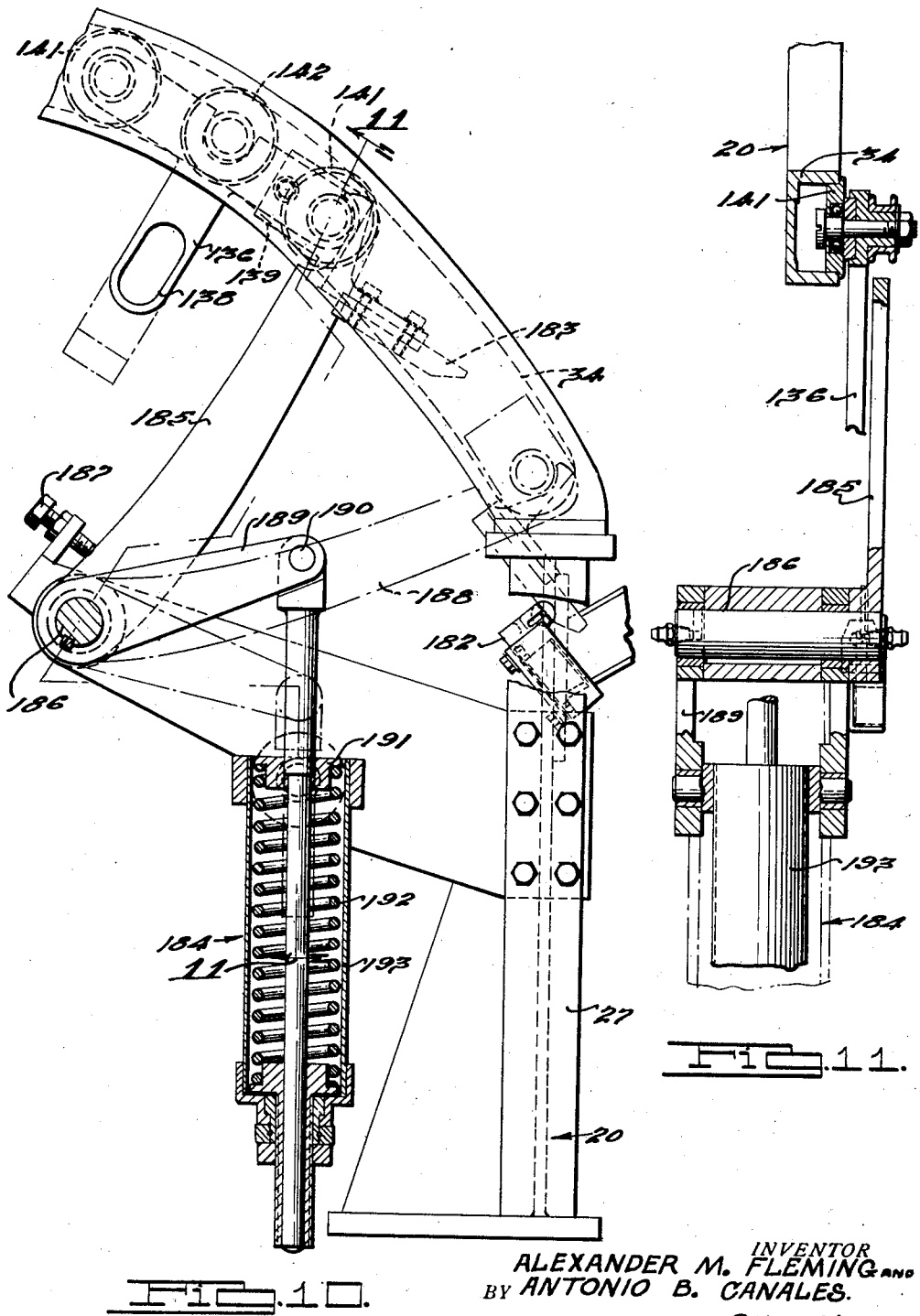

Sept. 24, 1940.	A. M. FLEMING ET AL	2,215,693
WELDING APPARATUS
Filed July 16, 1938	9 Sheets-Sheet 9
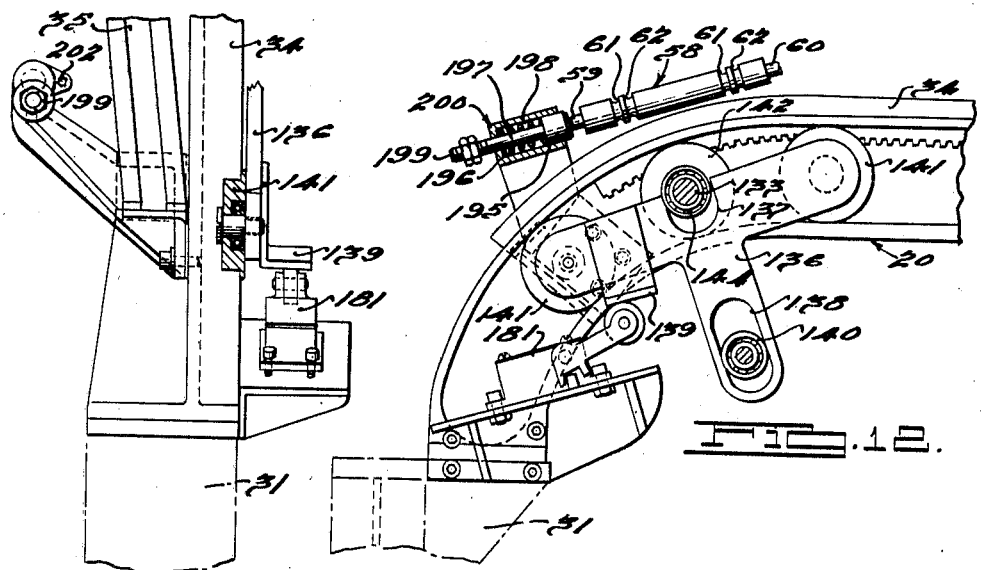
FIG.12.
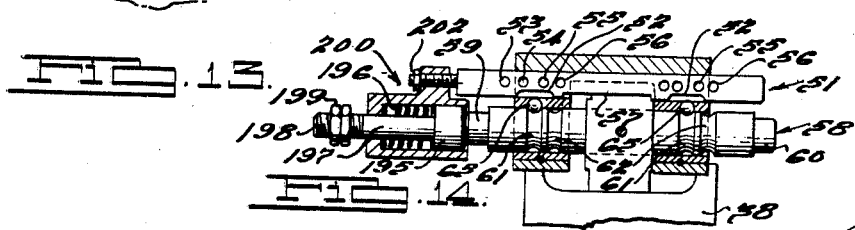
FIG.13.
FIG.14.
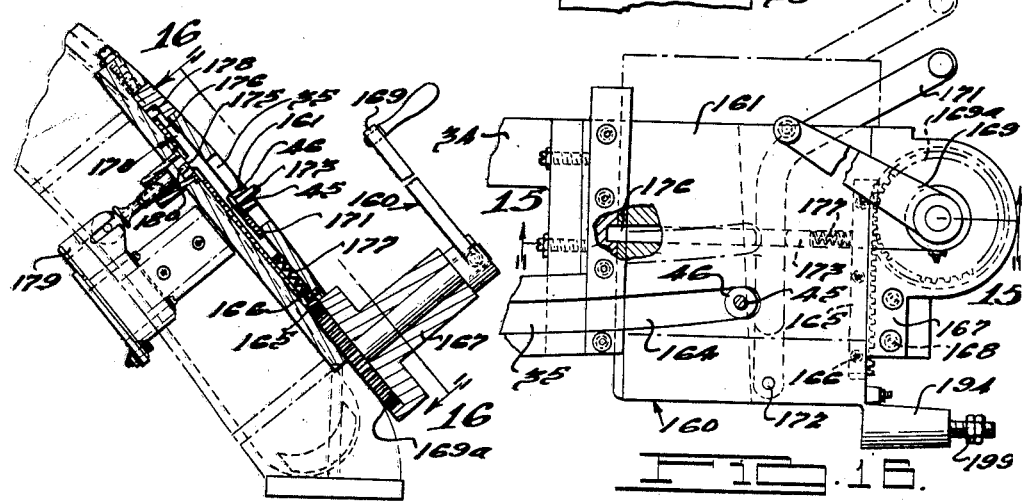
FIG.15.
FIG.16.
INVENTOR
ALEXANDER M. FLEMING AND
BY ANTONIO B. CANALES.
ATTORNEYS.

Patented Sept. 24, 1940

2,215,693

UNITED STATES PATENT OFFICE 2,215,693

WELDING APPARATUS

Alexander M. Fleming, Grosse Pointe, and Antonio B. Canales, Detroit, Mich., assignors to Chrysler Corporation, Highland Park, Mich., a corporation of Delaware Application July 16, 1938, Serial No. 219,500

16 Claims. (Cl. 219—4)

This invention relates to improved welding apparatus.

More particularly, the invention pertains to automatic welding apparatus for welding together two or more vehicle body parts, or two or more metal members.

One of the main objects of the invention is to provide an improved welding apparatus of this character by which the roof member of a vehicle body and the side members thereof may be simultaneously and automatically welded.

Another object of the invention is to provide apparatus of this kind which automatically and simultaneously welds the roof and side members of a vehicle body together at a predetermined series of points along successive curvilinear portions of the vehicle body members, and then automatically welds intermediate each of the welds of the first mentioned series of points of welding—this apparatus automatically effecting each weld by moving a welding gun carrying carriage to a predetermined welding position, forcefully engaging the work, effecting the weld, and releasing the work and moving the carriage to the next predetermined welding position.

Additional objects of the invention are to provide an apparatus of this character which automatically moves through the medium of a suitable source of power a welder to a predetermined series of points and then automatically adjusts the indexing mechanism of the welder and reverses the direction of the rotation of the aforesaid power source to move the welder over the same course to points intermediate the first mentioned series of points, and returns the welder to its original starting position and stops the rotation of the aforesaid power source after the welder indexing mechanism has been adjusted to permit the same initial movement of the welder with respect to the new work after the welded body has been unloaded; to provide in apparatus of this kind an indexing mechanism for automatically effecting the welds at a predetermined series of points and then effecting welds intermediate each of the first mentioned series of points; to provide apparatus of this kind that welds in a congested space entirely within the vehicle body and which therefore does not deface the outside of the vehicle body with welding and clamping marks; to provide apparatus of this character which automatically moves the welding gun carrying carriage along a track to bring the welding gun into welding receiving relationship with the vehicle body members and then returns the carriage over the same route and smoothly brakes the movement of the carriage at the end of its aforesaid trip.

Further objects and advantages of the invention will be apparent from the following detailed description of an embodiment of the invention, reference being had to the accompanying drawings, in which:

Fig. 1 is a side elevational view of a roof body welding apparatus embodying the invention.

Fig. 2 is a one-half plan view of the apparatus shown in Fig. 1.

Fig. 3 is a front end elevational view of the apparatus shown in Fig. 1.

Fig. 4 is a vertical, sectional view taken approximately as indicated by the line 4—4 of Fig. 2.

Fig. 5 is a vertical, sectional view taken along the line 5—5 of Fig. 2.

Fig. 6 is a vertical sectional view taken approximately on the line 6—6 of Fig. 5 and showing a portion of the indexing mechanism.

Fig. 7 is a detail sectional view taken approximately as indicated by the line 7—7 of Fig. 6.

Fig. 8 is a detail sectional view taken along the line 8—8 of Fig. 5 and showing a portion of the indexing and control mechanism.

Fig. 9 is a plan view of a portion of the carriage at its starting position, and the control mechanism therefor.

Fig. 10 is a partial elevational view, partly in section, of the carriage reversing and carriage cushioning mechanism.

Fig. 11 is a detail sectional view taken approximately as indicated by the line 11—11 of Fig. 10.

Fig. 12 is a vertical detail elevational view, partly in section, of the carriage reversing control mechanism, the section being taken along the line 12—12 of Fig. 3.

Fig. 13 is a front elevational view of the mechanism shown in Fig. 12.

Fig. 14 is a detail sectional view taken along the line 14—14 of Fig. 9 with the mechanism illustrated in its condition after the carriage has moved one-half of its cycle.

Fig. 15 is a detail sectional view taken approximately as indicated by the line 15—15 of Fig. 16.

Fig. 16 is a detail elevational view taken along the line 16—16 of Fig. 1, showing a portion of the manual control.

Fig. 17 is a diagrammatic view illustrating the electrical system for controlling and operating the apparatus.

In the form of the invention shown in the drawings, the improved welding apparatus comprises a base structure, generally indicated by the numeral 20, which supports the drip-moulding equipped top and side members 21, 22 and 23 respectively of a sedan style vehicle body to be welded along the edges 24 and 25 of the side members 22 and 23 having successive longitudinally misaligned portions. In the illustrated embodiment of the invention we prefer to show the welding apparatus operating upon automobile bodies, but attention is directed to the fact that other members of regular and irregular surface contour may be so treated with a bonding or welding device without departing from the scope of the invention.

The base structure 20 comprises a pair of arch-like members 26 and 27 between which the vehicle body is positioned, and further comprises outwardly projecting angle extensions 28, and reinforcing members 29 and 30 disposed between the arches 26 and 27. Each of the arches 26 and 27 comprises standards 31 with braces 32, and an upper member 33 having formed thereon an internal rack portion 34 and a grooved trackway 35 having successive longitudinally misaligned portions which are uniformly spaced from the edges 24 and 25 of the vehicle side members 22 and 23 when these body members and the welding apparatus are placed in welding receiving relationship. Suitable clamping members, such as that generally indicated at 36 on the extensions 28, are preferably provided to support and clamp the body members 21 to 23 so that these members are properly positioned to be automatically welded together.

A carriage or traveler, generally indicated by the numeral 37, is mounted on the stationary base trackway 35 for controlled movement longitudinally of the vehicle body and relative thereto. The carriage 37 comprises a pair of slidably connected extensible bars 38 and 39 slidably mounted in a driving mechanism support split casing 40, the bar 38 being slotted at 41 to clear certain members as will presently be set forth. Provided on the outer extremities of the bars 38 and 39 are spaced bearings having aligned passages 40ᵇ which are joined by a passage 40ᵃ and connecting opening 40ᶜ formed in the outer end portions of the extensible bars. Gibs 42 are receivable by the beveled faces of the bars 38 and 39 within the casing 40, and adjustment bolts 43 carried by the casing 40 provide a means for eliminating undesirable excessive clearances caused by wear between the extensions and the casing. Each of the extensible bars 38 and 39 has fixed thereto by a round-head bolt and nut 44 a guide block 45, the head of the bolt 44 mounting a roller 46 receivable by the groove in the trackway 35. Maximum relative movement of the extensions 38 and 39 is permitted by the nut 44 being received within the slot 41 of the extension 38. The guide block 45 carries threaded pins 47 each of which rotatably supports a roller 48 adapted to support the carriage 37 on the upper portion of the trackway 35. This guide block 45 and its bearing 46 follow the grooved trackway to move the extensions 38 and 39 inwardly or outwardly relative to each other in accordance with the variations in longitudinally misaligned portions of the trackway corresponding to the curvative body edges 24 and 25.

A shifter rail 51 is slidably mounted in the passage 40ᵃ of the outer end portion of each of the extensible bars 38 and 39 (best shown in Fig. 9) and is adapted to move transversely of the paths of these bars. The rail 51 comprises a pair of recesses 52 and a series of aligned detent recesses 53, 54, 55 and 56, and an elongated slot 57. A cylinder head casing support shifter rail 58 is slidably mounted in the bearing opening 40ᵇ of the outer end portions of the extensible bars 38 and 39. The rail 58 comprises reduced extremities 59 and 60, and has annular grooves 61 and 62 formed in its end portions. Ball detents 65 are disposed within the connecting openings 40ᶜ of the end portions of each of the extensible bars 38 and 39 to selectively register with the grooves 52, 61, 62, 63 and 64 of the rails 51 and 58 under such conditions as will hereinafter be more apparent. Spring detents 67 (best shown in Fig. 4) are carried by the end portions of each of the bars 38 and 39 to yieldingly register with one of the recesses 53 to 56 of the rail 51 and are shown in Fig. 9 as registering with the recesses 53.

Welding guns, generally indicated by the numerals 68 and 69, are mounted at the outer extremity of the bars 38 and 39 respectively adjacent the registering edges of the vehicle body members 21 to 23 to be automatically welded. These guns comprise a cylinder head casing 70 having an extension 71 with a slotted portion 72 non-rotatably secured to the rail 58 by which they are pivotally supported. The extension 71 is interposed between the bearing portions of the associated extensible bar and is sufficiently smaller than the space between the bearings to accommodate transverse movement of the rail 58 and welding gun relative to the bars. The extension 71 has the slotted portion 72 in which a portion of the rail 51 is received. The rail 51 engages a side of the slot 72 to prevent downward swinging of the gun beyond a predetermined position.

An electrode mounting member 73 carries a welding electrode or welding point 74, and an arm 75 and is pivotally mounted by a threaded pin 76 on the casing 70. A yoke shaped electrode carrying member 77 having a welding electrode or welding point 78 and arm 79 is pivotally mounted on the pin 76 so that the electrodes 74 and 78 will contact opposite sides of the parts to be welded together. Any irregularities in the edges of the vehicle body members to be welded will be accommodated by pivotal movement of the gun relative to the bar. Each of the arms 75 has pivotally connected thereto a pair of links 80 which are pivotally connected together at 81 on a gun actuating piston rod 82. This piston rod 82 is secured to a piston 83 (best shown in Fig. 4) reciprocable within a cylinder casing 84 fixed to the casing 70 and having fluid pressure inlet members 85 and 86 receiving fluid pressure lines 87 and 88 respectively. Fluid pressure, preferably air pressure, is admitted through the line 87 to force the piston 83 downwardly to move the electrodes 74 and 78 apart. When fluid pressure is admitted through the line 88 the piston 83 is urged upwardly to move the arms 75 and 79 apart to clamp the electrodes with the desired clamping pressure for effecting good electric spot welds. Electric current is supplied through lines 89 and 90 leading to the arms 75 and 79 to effect welds between the electrodes of each of the welding guns in a manner well known to those familiar with the art.

The support casing 40 of the carriage 37 has fixed thereto by bolts 91 an indexing and driving mechanism casing 92 having a pipe supporting extension 93. A cover 94 is detachably secured by bolts 95 to the casing 92. Within the casing 92 a splined end shaft 96 is journaled by bearings 97 and 98 mounted on the casing 92 and cover 94 respectively. A Geneva gear 99 is keyed at 100 to the shaft 96.

Extending through the casing 92 is a driving shaft 101 having splines 102 and a reduced threaded end portion 103, the shaft 101 being mounted on bearings 104 and 105 carried by the casing 92 and cover 94 respectively. The shaft 101 has non-rotatably secured thereto by keys 106 a Geneva pinion 107 which is adapted to rotate the Geneva gear 99 so that the carriage 37 will move along the trackway 35 and automatically stop before each weld is effected and then start, as will presently be more evident. A ball bearing thrust member 108 is mounted on the hub of the pinion 107, and a gear 109 having a hub 110 with nibs 111 is non-rotatably interposed on the shaft 101 between the bearings 103 and 105. On the splined end 102 of the shaft 101 is an internally splined sleeve 112 having a flange 113 and recesses 114 which register with the nibs 111 of the gear 109. A coil spring 115 is interposed between the flange 113 and a washer 116 adjustably held on the reduced threaded end portion 103 by lock nuts 117. The nibs 111 and recesses 114 function as a slip clutch to allow the gear 109 to rotate relative to the shaft 101 in an emergency so as to protect the prime mover and welding apparatus during failure or jamming of the mechanism. A tubular end cover 118 is detachably secured to the casing cover 94 to house this slip clutch mechanism.

The other end of the shaft 101 has keyed thereto at 119 a sprocket chain gear 120 and a distributor mechanism 121 having a hub 122 and a pair of off-set cams 123 and 124 with adjustment slots 123ª into each of which an adjustment member 124ª extends. A suitable prime mover, such as the electric motor 125 is bolted at 126 to the casing 92 and has a shaft 127 to which a worm gear 128 is non-rotatably secured and in constant mesh with the gear 109.

A pair of brackets 129 are fixed to the casing 40 and are reinforced by a strut 130 to which is secured electric insulators 131 for supporting the electric lines 89 and 90. Drivingly coupled at 132 to each of the opposite ends of shaft 96, as illustrated, is a shaft extension 133 which is journaled by bearings 134 mounted on the brackets 129. A drive pinion 135 is drivingly secured to the outer end of each of the shaft extensions 133 in engagement with the rack portion 34.

A T-shaped bracket 136 is provided to move the carriage 37 upright and substantially tangent to the successive longitudinally misaligned portions of the rack portion 34. The bracket 136 comprises an open slot 137, an elongated closed slot 138 and an electric switch actuating member 139. The lower slot 138 of the bracket 136 receives a bearing 140 mounted on each of the brackets 129 to effect relative movement between the brackets 136 and 129. Flanged rollers 141 are rotatably mounted on each end of the long portion of the T-shaped bracket 136 and are adapted to ride on a flat portion of the rack portion 34. A floating roller 142 (best shown in Figs. 5 and 12) is journaled by a bearing 143 on the shaft extensions 133. A bearing 144 is mounted on each of the shaft extensions 133 in the slot 137 of the bracket 136 and between the bearings 143 and 134. The end rollers 141 of the bracket 136 are permitted to follow the successive longitudinally misaligned portions of the rack 34 by reason of the slots 137 and 138 accommodating this movement.

A valve casing 145 is mounted on the other face of the casing 92 and rotatably mounts a chain drive pinion 146 keyed to a shaft 147 (best shown in Figs. 6 and 7). The pinion 146 and the sprocket 120 are drivingly connected by a block chain 148. The casing comprises a tubular portion 149 within which the shaft 147 extends in leak-proof engagement, and further comprises a detachably secured cover 150 having apertures 151, 152 and 153. The apertures 151 and 152 receive the fluid pressure lines 88 and 87 respectively which are supported by the extension 93 and communicate with the cylinder 84 of the welding guns 68 and 69, the aperture 153 being open to the atmosphere for exhausting the air pressure within the casing 145. Air is admitted to the casing 145 through an air line 154 communicating with a suitable source of air pressure. A rotatable pressure valve 155, rotatable at twice the speed of the pinion 107, is drivingly carried by the end of the shaft 147 within the casing 145 and comprises arcuate passages 156 and 157, a branch passage 158 and a tubular passage 159 which in its illustrated position communicates between the air pressure chamber of the casing 145 and the arcuate passage 156. During rotation of the valve 155 the air pressure alternately is admitted through the passages 159, 156 and the line 88 while the air pressure within the line 87 is exhausted through the passages 157 and 158 and then admitted through the passages 159, 156 and the line 87 while the air pressure within the line 88 is exhausted through the passages 157 and 158.

A welding gun shifting mechanism, generally indicated by the numeral 160, is provided adjacent one end of the trackway 35 to provide a control with which the operator can move the welding guns toward each other to facilitate loading and unloading of the vehicle body members to be welded. Since the support and control mechanisms for the guns 68 and 69 are identical, that for the gun 69 will be described as the representative one. A slidable plate 161 is supported on the base structure 20 and is adapted to slide transversely to the course pursued by the carriage 37. A gib structure 162 is in retaining contact with the plate 161 and is adapted to be adjusted by screws 163 extending through a flange of the base structure 20. An open end recess 164 is formed on the plate 161 and normally registers with the lower portion of the trackway 35 to facilitate moving the casing 40 and welding guns entirely off the trackway 35 and onto the plate 161. A rack 165 is fixed to the under side of the plate 161 by fasteners 166. Overlapping the rack 165 is a plate 167 which is detachably secured at 168 to the base structure 20. A pinion 169ª, meshing with the rack 165, is rotatably supported on the plate 167 and has nonrotatably secured thereto a control arm 169. The plates 161 may be shifted toward each other by swinging the arm 169 clockwise as viewed in Fig. 9, when the guide block 45 engages in the recess 164, so as to move the welding guns inwardly from their illustrated positions to facilitate unloading or loading of the vehicle body members.

A safety lock, generally designated by the numeral 170, is provided to simultaneously interrupt the electric current to the motor 125 and permit the plates 161 which support the guns when they are at the rear end of their stroke to be moved toward each other to facilitate loading and unloading of the vehicle body members.

The safety lock 170 comprises a lever arm 171 pivotally mounted at 172 on the plate 161. A rod 173 is slidably mounted on the plate 161 in operative engagement at 174 with the lever arm 171 and has formed thereon a nib 175 and a reduced end portion 176. The end portion 176 is normally yieldingly urged by a spring 177 into locking engagement with a slot 178 formed on the stationary structure 162 to prevent movement of the plates 161 relative to the base structure 20. An electrical switch 179 carried by the base structure 20 has a spring-urged contact member 180 engageable with the nib 175 as illustrated in Figs. 9 and 15, so as to interrupt the electric current to the motor 125 when the reduced end portion 176 is out of engagement with the slot 178. When the lever arm 171 is moved counterclockwisely as viewed in Fig. 9, the reduced end portion engages the slot 178 to prevent relative movement between the plates 161 and the base structure 20, and the nib 175 is moved out of engagement with the contact member 180 to close the switch 179 which controls the current to the motor 125. Thus the motor 125 is operative only when the groove 164 of the plate 161 is aligned with the channel 35 of the track-way.

An electrical reversing switch 181 (best shown in Figs. 1 and 12) is mounted on the base structure 20 adjacent the forward extremity of the rack 34 to be actuated by the actuating member 139 so as to automatically reverse the direction of rotation of the motor 125. Another reversing switch 182 is mounted on the base structure adjacent the rearward extremity of the rack 34 to be actuated by an actuating member 183 carried by the bracket 136 when the carriage 37 returns to its original starting position so as to automatically reverse the direction of rotation of the motor 125. As the motor 125 drives the pinion 135 the carriage 37 automatically moves forwardly until it strikes the switch 181 whereupon the motor is reversed and the carriage is returned to its original starting position where the switch 182 is closed to reverse the motor again. The switch 182 is so located on the base structure 20 that the bearing 46 will strike the safety lock arm 171, as shown in Fig. 16, so that the reversing switch 182 will be actuated just before the bearing 46 strikes the arm 171. This arrangement of the switch 182 and the safety lock arm 171 automatically reverse the direction of rotation of the motor 125 just prior to the cutting off of the current to the entire apparatus by engagement of the bearing 46 with the arm 171, so as to automatically condition the apparatus to move the carriage 37 forwardly again when new work is loaded on the apparatus and the lever 171 is manually reset.

To yieldingly return the heavy carriage 37 to its original starting position, a cushioning device 184 is employed. The device 184 (best shown in Figs. 1, 10 and 11) comprises an arm 185 pivotally mounted at 186 on the base structure 20 and adapted to swing between an adjustable stop 187 and a position indicated at 188. A yoke member 189 is non-rotatably secured to the lower end of the arm 185 and has pivotally connected at its free end 190 a piston member 191 which is yieldingly opposed by a spring 192 disposed in a casing 193 mounted on the base structure 20. When the arm 185 has moved to the position 188 further movement of the arm 185 is prevented by the rollers 141 which contact with the end of the rack 34.

An open end casing 194, shown in Figs. 9, 12, 13 and 16, is carried by each of the plates 161 for each of the welding guns 68 and 69. A piston 195 is yieldingly urged by a spring 196 within the casing 194 to its open end, and has a threaded piston rod 198 which extends through the closed end of the casing to receive adjustment lock nuts 199 for varying the pressure exerted by the spring 196 on the piston 195. A similar spring and piston mechanism 200 is mounted on the base structure 20 near the front extremity of the rack 34 for each of the welding guns 68 and 69. Each of the front and rear casings 194 are so constructed and arranged that the end portions 59 and 60 of one of the rails 58 will register with the open ends of the rear and front casings 194 respectively preferably at the same time that the reversing switches 181 and 182 are actuated during the travel of the carriage 37.

The front and rear mechanisms comprising pistons 195 are adapted to automatically control the setting of the guns on the carriage 37 so as to produce a series of uniformly spaced spot welds during one direction of movement of the carriage, and a second series of spot welds during reverse movement of the carriage, the second series of spot welds being located intermediate adjacent spot welds of the first series. That is, if the first series of spot welds are 2" apart, the return series would be intermediate the former series so as to effect a resulting new series of spot welds 1" apart.

Adjustable stops 201 and 202, shown in Figs. 9 and 14, are mounted on the casing 194 and the base structure 20 and are so arranged with respect to the rails 51 and 58 that during movement of the carriage 37 to its forward position the rail 51 strikes the forward stop 202, causing the rail to move rearwardly so that the groove 62 and rearward portion of the recess 52 are aligned and the detents 67, shown in Fig. 4, register with the recesses 54. During continued travel of the carriage 37 forwardly, the reduced end portions 59 of the rails 58 strike the pistons 195 of the forward yieldable mechanisms 200, and the groove 61 and the forward portion of the recess 52 are aligned to permit the detents 65 to engage in the recess 52. During further movement of the carriage forwardly, the rail 58 is held against forward movement by the yieldable member 196 and the rail 51 is positively held against forward movement by the stop 202. This causes the carriage to move forwardly relative to the rail 51 sufficiently to bring the recess 52 out of registration with the detents 65, thereby locking the rail 58 and gun in a reset position. A similar action takes place at the end of the rearward movement by which the rail 58 and gun carried thereby are returned to their original forward travel position.

Electrical transformers 203 and 204 are mounted on the base structure and are adapted to supply an electric current to the welding gun lines 89 and 90 of the welding guns 68 and 69. The transformers 203 and 204 are preferably electrically arranged in parallel and adapted to supply an electrical current of high amperage and low voltage suitable for electric resistance welding in a manner well known to those familiar with the art.

Electric relay switches 205 and 206 are mounted on brackets 207 fixed to the casing 92. The switches 205 and 206 comprise an elongated slot 208 within which an axially mounted roller 209 is adapted to be yieldingly urged outwardly, the roller of the switches 205 and 206 being adapted to be moved inwardly by the cams 123 and 124 respectively during rotation of the gear 109. These cams 123 and 124 simultaneously close the switches 205 and 206 to cause the electrical current from the transformers to pass to the welding guns for effecting two welds simultaneously.

In the electrical system diagram shown in Fig. 17, a suitable alternating current is supplied through line 210 and 211 from a suitable source (not shown). A suitable electrical master switch 212 is electrically interposed between the line 210 and the safety switch 179. The safety switch 179 electrically controls a line 213 leading to both of the transformers 203 and 204. A conductor 214 connects the line 213 with each of the cam actuated switches 205 and 206 which simultaneously electrically connect leads 215 and 216 respectively in response to the revolving of the cams 123 and 124. Relay switches 217 and 218 have connected thereto the leads 215 and 216 respectively, and also have leads 219 connected with the line 211. Electrical contact members 220 of the relay switches are adapted to contact leads 221 connected to the transformers 203 and 204 in response to current being passed through the relays 217 and 218 from the cam actuated switches 205 and 206.

When the contacts 220 and 221 are closed, the transformers 203 and 204 receive the primary current from the lines 210 and 211 and convert it into suitable electric current of low voltage and high amperage suitable for the welding guns 68 and 69. The relays 217 and 218 are preferably of the type for use in electrical circuits for welding apparatus and are adapted to close the contacts 220 and 221 for a predetermined period depending on the nature of the weld desired. Any suitable time switch mechanism (not shown) adapted to properly predetermine the length of the welding period may be employed.

The motor 125 illustrated is of the well known A. C. reversing type having an electric terminal box 222 which is electrically connected by lines 223 and 224 with the lines 211 and 210 respectively. The motor further comprises a reverse mechanism 225 which is adapted to reverse the direction of drive of the motor 125 in response to closing of one of the reversing switches 181 and 182 which are electrically connected with the mechanism 225 by lines 226 and 227 respectively. A line 228 electrically connects the mechanism 225 and the line 213 to complete the circuit.

With reference to the operation of the illustrated embodiment of the invention, when the welding apparatus operator desires to simultaneously weld the drip moulding equipped roof and side members 21, 22 and 23, respectively, he clamps these body members on the base structure 20. To facilitate the loading of the body members, the arms 169 should be swung clockwisely, as viewed in Fig. 9, to move the guns 68 and 69 toward each other subsequently to the safety lock arm 171 being swung in a clockwise direction to its illustrated position of Fig. 9 by the guide block 45 striking the safety lock arm 171.

After the body members are loaded, fluid pressure, preferably air, is admitted into the line 154 and the arm 169 is swung counterclockwisely to bring the guns into welding receiving relationship with the body members, and the latch 176 snapped by the spring 177 into locking engagement with the slot 178. The master switch 212 is then closed and an electric current passes through the safety switch 179 to the lead box 222 of the motor to operate the motor 125 for moving the carriage 37 forwardly by operation of the pinion 135 and the racks 34. The Geneva gear 99, through which this drive is transmitted to the pinion 135, automatically stops and starts the carriage 37 at predetermined spaced series of welding positions in its travel forwardly.

With the closing of the master switch 212, the electric current also passes to the relay switches 205 and 206, the cams 123 and 124 being revolved by the motor 125 to periodically close the relay switches to actuate the relays 217 and 218 for controlling the electric current supplied by the transformers 203 and 204 to the welding guns. The electric current is periodically admitted to the welding guns so that the welds will be automatically effected at each of the predetermined spaced welding positions at which the carriage 37 stops during both its travel forwardly and rearwardly. During the revolving of the cams 123 and 124, the valve 155 rotates in synchronism so as to automatically admit and exhaust alternately the air pressure to the lines 87 and 88 communicating with the cylinders 84 to clamp and unclamp the welding gun electrodes 74 and 78 just prior and subsequently respectively to the admittance of welding current to the electrodes when the carriage 37 is stopped at each of the aforesaid predetermined positions. In this unique sequence of automatic operation, the carriage 37 is stopped at a predetermined point; the electrodes 74 and 78 clamp the work, electric current is admitted to the electrodes to effect the weld; the electrodes are unclamped; and the carriage moves to the next predetermined point.

As the carriage approaches the forward extremity of its travel on the rack 34, the rails 58 and 59 strike the stops 200 and 202 respectively and the welding guns are automatically indexed so as to effect a weld intermediate each of the welds previously formed. At the extremity of travel of the carriage 37 forwardly, the actuating portion 139 closes the reversing switch which actuates the motor reversing mechanism for reversing the direction of drive of the motor 125. During the travel of the carriage 37 rearwardly, the switch 181 is opened and the welds are automatically effected intermediate each of the welds effected during the forward movement of the carriage, and the sequence of welding operation is the same.

During the latter portion of the travel of the carriage, the rails 58 and 59 strike the rear stops 195 and 201 respectively and the welding guns are automatically indexed so as to stop at the same points when the old work is unloaded and the new work is loaded as it did on its initial trip. As the rails 58 and 59 index the carriage return movement, the cushioning device 184 yieldingly allows the heavy carriage 37 to return to its original starting position, and the actuating member 183 closes the rear reversing switch 182 to actuate the motor reversing mechanism 225 for reversing the motor drive. Just as soon as the direction of drive of the motor is reversed and the switch 102 is open, the bearing 46 strikes the safety lock arm 171 during the remaining portion of the carriage's travel rearwardly, which safety lock arm opens the switch 179 and unlatches the reduced portion 176.

The operator then swings the arm 169 clockwisely, as viewed in Fig. 9, to facilitate the unloading of the welded vehicle body by moving the welding guns apart. The welding apparatus is then ready to receive new work which is then handled in the same manner as set forth in the foregoing operation.

The sequence of operation of the apparatus of automatically welding the work first at a predetermined series of points and then welding intermediate each of these welds is highly desirable inasmuch as the welding heat is localized and cools sufficiently to prevent distortion before the intermediately spaced welds are effected.

The paths of movement of the guns can be predetermined by suitably constructing the track mechanism on which the carriage is mounted and the track mechanism by which the guns are moved inwardly and outwardly, in order to cause the movement of the guns to conform to the curvature and shape of the work operated upon. In welding automobile bodies, welds may be formed continuously from the front to the rear of the panel structure thereof even though these panel structures vary in curvature in two planes.

In the operation of the welding apparatus, the operator need not be skilled inasmuch as it is purely automatic and fast. The welds produced along the successive longitudinally misaligned portions of the body members by the apparatus are automatic and are not left to the discretion of the operator, thus effecting uniform and efficient welds.

Various modifications and changes will be readily apparent from the teachings of our invention, as set forth in the appended claims, and it is not our intention to limit our invention to the particular details of construction and operation shown and described for illustrative purposes.

What we claim is:

1. Apparatus for permanently uniting members having aligned surface portions comprising a frame support, a member bonding device adjustably mounted on said support, a support for said members to be bonded, said supports being relatively movable for bringing successive adjacent portions of said members into bond receiving relationship with said device, means for producing intermittent movements of said device relative to said members in one direction to bring said members and said device into bond forming relationship at successive spaced points on said members, and means for reversing the direction of said intermittent movements of and adapted to bring the latter said members and said device into bond forming relationship at points on said members intermediate said first series of points.

2. Apparatus for permanently uniting members having aligned surface portions comprising a frame support, a member bonding device adjustably mounted on said support, a support for said members to be bonded, said supports being relatively movable for bringing successive adjacent portions of said members into bond receiving relationship with said device, and means including a Geneva gear for first moving said device in one direction into bond receiving relationship at successive points on said members and reversing said movement of said device to bring said device into bond engagement with said members at points intermediate each of said first series of points.

3. Apparatus for permanently uniting members having registering laterally and longitudinally misaligned successive adjacent surface portions comprising a frame support, a member bonding device adjustably mounted on said support, a support for said members to be bonded, said supports being relatively movable for bringing successive adjacent portions of said members into bond receiving relationship with said device, and means including guide mechanism mounted on said frame and elements carried by said device coacting therewith for automatically adjusting said device in two directions transverse to each other during said relative movement of said supports, said guide mechanism being so constructed and arranged as to confine said device to a course defined by a series of points on said laterally and longitudinally misaligned successive adjacent surface portions, and means for intermittently arresting said movements and actuating said device at each of said points.

4. Apparatus for permanently uniting members having registering misaligned successive adjacent surface portions comprising a frame support, a member bonding device mounted on said support, a support for said members to be bonded, said supports being relatively movable in two directions transverse to each other for bringing successive adjacent misaligned portions of said members into bond receiving relationship with said device, and means for automatically successively moving said device into bond receiving relationship with a series of misaligned points on said misaligned successively adjacent surface portions and then returning said device to its original starting position.

5. Apparatus for welding members having aligned surface portions comprising a base support, a welding gun carrying carriage mounted on said base support and adapted to reciprocate thereon through a predetermined course, an adjustable welding gun mounted on said carriage, means for automatically moving said carriage to bring said gun into welding receiving relationship at a predetermined series of points with said aligned portions of said members to be welded and then returning said carriage to its original starting position, and means for automatically braking the movement of said carriage just prior to its reaching its original starting position.

6. Apparatus for simultaneously welding the roof and side members of a vehicle body having misaligned successively adjacent surface portions misaligned laterally and longitudinally of said body comprising a frame support, welding guns adjustably mounted on said support, a support for said body members, said supports being relatively movable laterally and longitudinally of said body for bringing successive adjacent portions of said members into welding receiving relationship to said guns, means for simultaneously admitting an electrical current to said guns, and means for automatically adjusting each of said guns toward and away from said misaligned successively adjacent surface portions for maintaining said guns at a substantially uniform distance from said surface portions as said guns are brought into welding receiving relationship with said successive surface portions.

7. In a welding apparatus, a support structure having means for positioning work to be operated on, a track extending mainly in the direction of the length of said frame structure having curvilinear portions, a carriage structure mounted on said track and movable lengthwise thereof and in one direction transverse of said frame structure, welding means carried by said carriage structure and movable relative thereto in a course transversely of the directions of movement of said carriage, guide mechanism including coacting members on said support structure and carriage respectively for shifting the latter in said course in response and in timed relation to movement of said carriage on said track, and means for intermittently moving said welding means relative to said support structure and work.

8. In a welding apparatus, a support structure having means for positioning work to be operated on, a track on said support structure extending in a curvilinear course in a plane disposed mainly lengthwise of the latter, a carriage structure mounted on said track and movable in said course, welding means carried by said carriage structure and movable relative thereto transversely of said plane, mechanism including coacting members on said support structure and carriage respectively responsive to said movement of said carriage in said curvilinear course for moving said welding means transversely of said plane in timed relation to movement thereof in said course and adapted to compensate for variations in the width of the work operated on by said welding means, said mechanism including a cam track extending longitudinally of said support structure and contacting with said welding means, said cam track including a wall portion having a contour corresponding to the contour of the work operated on by said welding means, means drivingly operating upon said carriage for producing intermittent movement thereof in said course, and apparatus for automatically actuating said welding means between successive steps of said intermittent movement.

9. In a welding apparatus, a support structure having means for positioning work to be operated on, a carriage structure mounted on said support structure and movable longitudinally with respect thereto, intermittently operable welding means mounted on said carriage structure, mechanism for intermittently moving said carriage structure and said welding means relative to said work, and means for effecting intermittent operation of said welding means in timed relation to intermittent movement of said carriage structure.

10. In a welding apparatus, a support structure having means for positioning pieces of work to be welded together, a carriage mounted on said support structure and movable longitudinally with respect thereto, intermittently operable welding means carried by said carriage, mechanism for intermittently moving said carriage relative to said support to position said welding means at successively spaced locations on said work, and means for automatically operating said welding means when said carriage is disposed at each of said locations.

11. In a welding apparatus, a support structure having means for positioning pieces of work to be welded together, a carriage mounted on said support structure and movable longitudinally with respect thereto, intermittently operable welding means carried by said carriage, means carried by said carriage for intermittently operating said welding means to clamp said pieces of work into welding receiving relationship, mechanism for intermittently moving said carriage relative to said support to position said welding means at successively spaced locations on said work, and means for automatically operating said welding means when said carriage is disposed at each of said locations.

12. In a welding apparatus, a support structure having means for positioning pieces of work to be welded together, a carriage mounted on said support structure and movable longitudinally with respect thereto, intermittently operable welding means carried by said carriage adapted to clamp said pieces of work together, mechanism for intermittently moving said carriage relative to said support to position said welding means at successively spaced locations on said work, means for automatically operating said welding means when said carriage is disposed at each of said locations to clamp said pieces of work together, and means for automatically energizing said welding means thereafter when said carriage is disposed at each of said locations for producing a weld.

13. In a welding apparatus, a support structure having means for positioning pieces of work to be welded together, a carriage mounted on said support structure and movable longitudinally with respect thereto, intermittently operable welding means shiftably carried by said carriage, mechanism for intermittently moving said carriage and welding means relative to said support to position said welding means at successively spaced locations on said work, means for automatically operating said welding means when said carriage is disposed at rest at each of said locations, and means for shifting said welding means relative to said support and said work.

14. In a welding apparatus, a support structure having means for positioning pieces of work to be operated on, clamping means operable on said pieces of work, a carriage mounted on said support structure and movable relative thereto, welding means carried by said carriage including jaw members adapted for intermittently clamping said pieces of work together, means for intermittently moving said carriage and welding means relative to said work, and means for effecting intermittent operation of said jaws and effecting a weld in predetermined time relation with respect to each other and with respect to said intermittent movement of said carriage.

15. In a welding apparatus, a support having means for positioning pieces of work to be welded together, a carriage movably mounted on said support, means for confining movement of said carriage to a course of travel extending along the junction of said pieces of work, intermittently operable welding means shiftably mounted on said carriage for movement relative thereto in the direction of its course of travel, driving mechanism for intermittently moving said carriage and said welding means in unison progressively to spaced locations with respect to said work, means for automatically operating said welding means while said carriage is at rest at said locations between successive intermittent movements thereof, means for reversing the direction of movement of said carriage and welding means when the former reaches a predetermined position relative to said work, and mechanism for shifting said welding means relative to said carriage for conditioning said welding means to operate upon said work at locations between each of said first mentioned locations during its reversed travel.

16. In a welding apparatus, a support structure having means for positioning pieces of work to be operated on, a carriage mounted on said structure and movable relative to the latter and said work, welding means carried by said carriage, mechanism for intermittently moving said carriage and welding means, means operable in timed relation with movement of said carriage and welding means for causing the latter to effect welding operations at spaced locations on said work, means for reversing the direction of movement of said carriage and welding means with respect to said support structure and work, and means for effecting relative movement between said work and said welding means for conditioning the latter to effect welding operations on said work at locations intermediate said first mentioned locations when said carriage and welding means are moved in the reversed direction.

ALEXANDER M. FLEMING.
ANTONIO B. CANALES.